Sept. 1, 1931.  C. B. NELSON  1,821,569
SAWING-TRIMMING MACHINE
Filed March 19, 1929  6 Sheets-Sheet 6
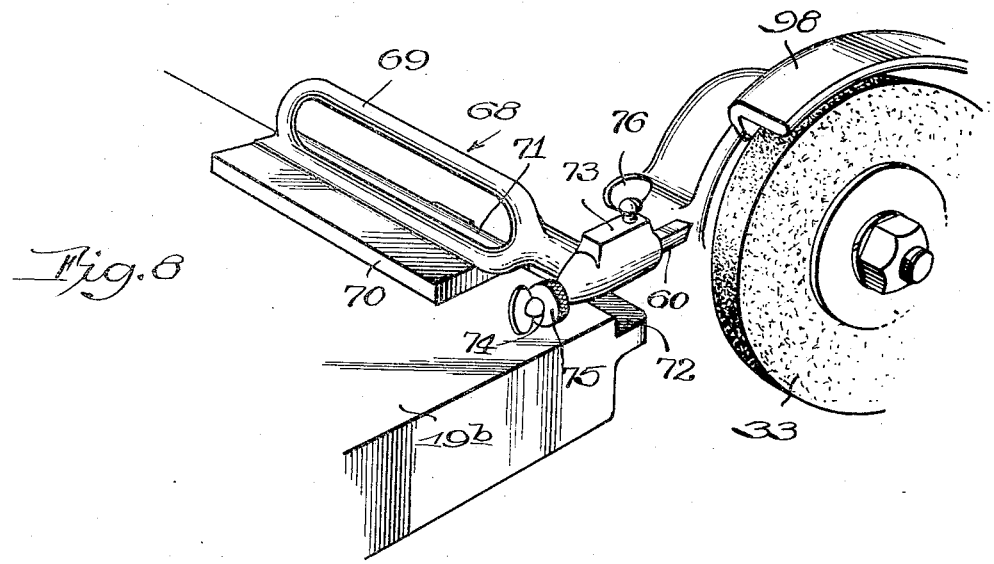
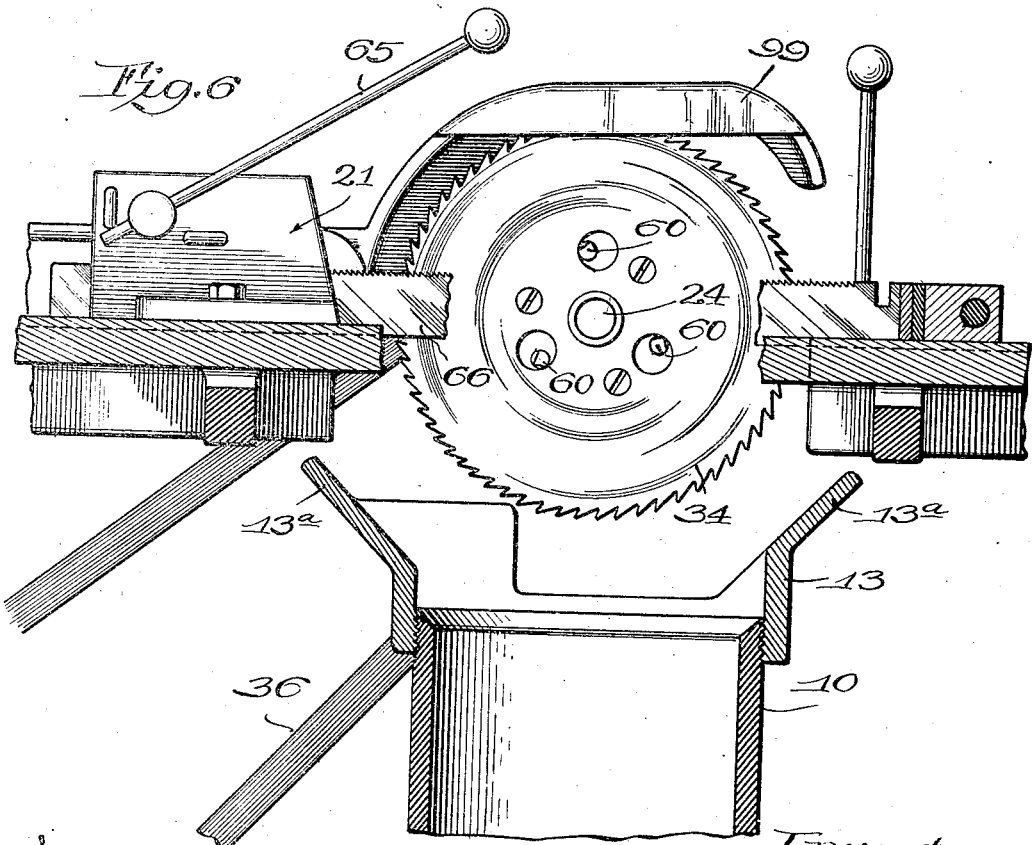

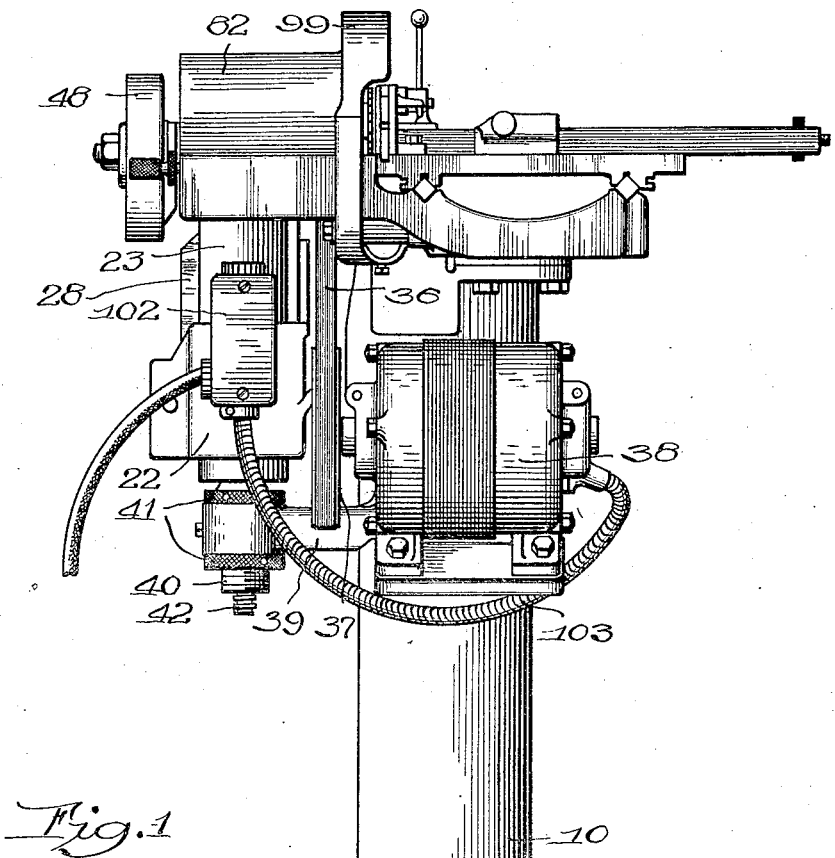
Fig.1
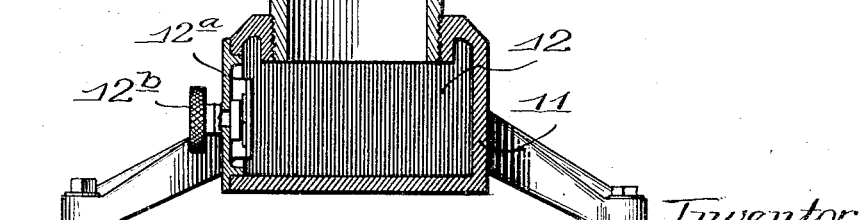

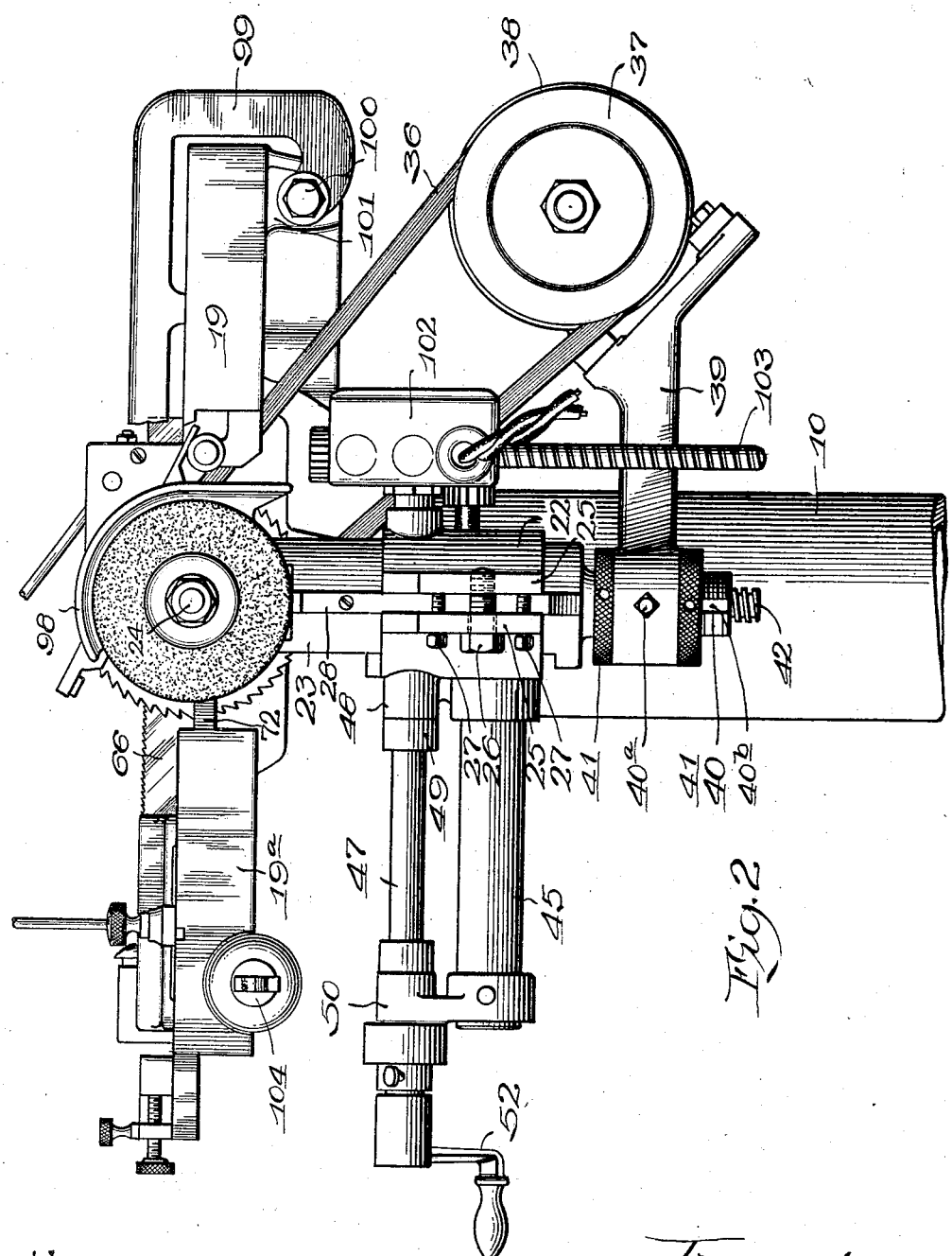

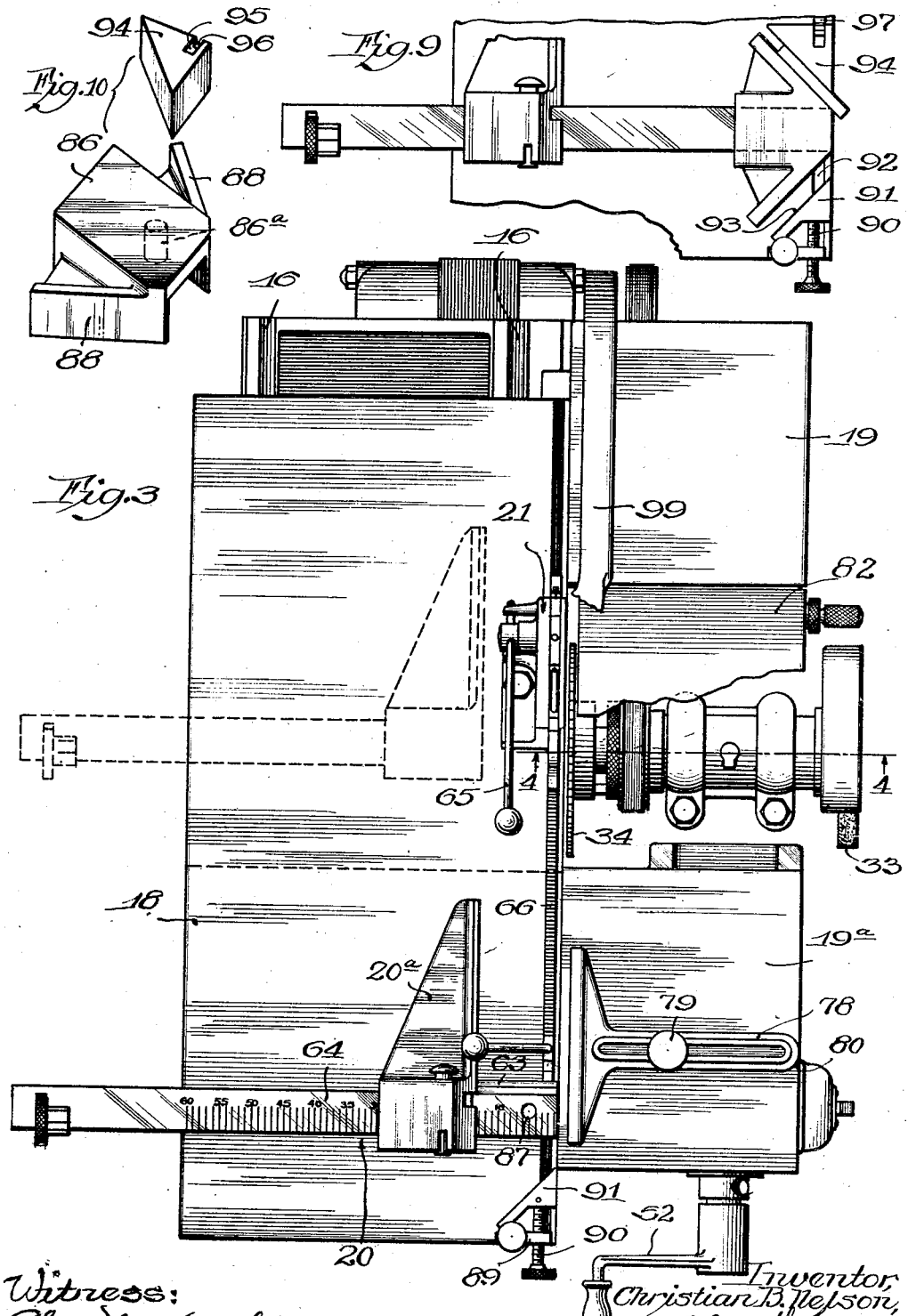

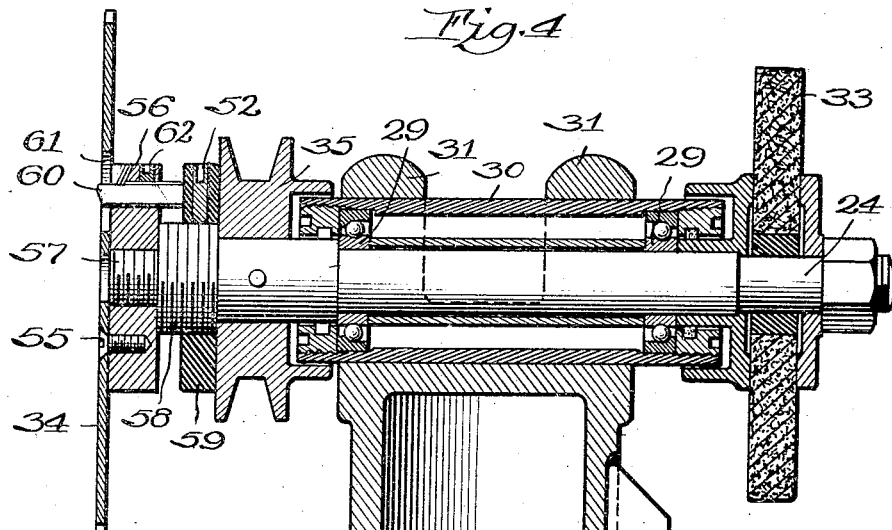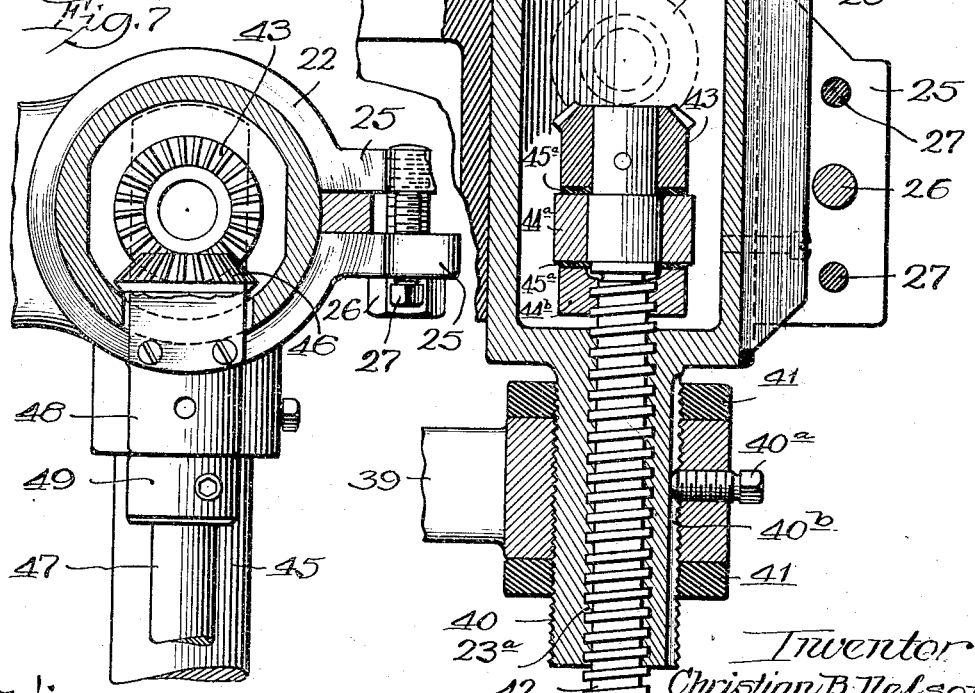

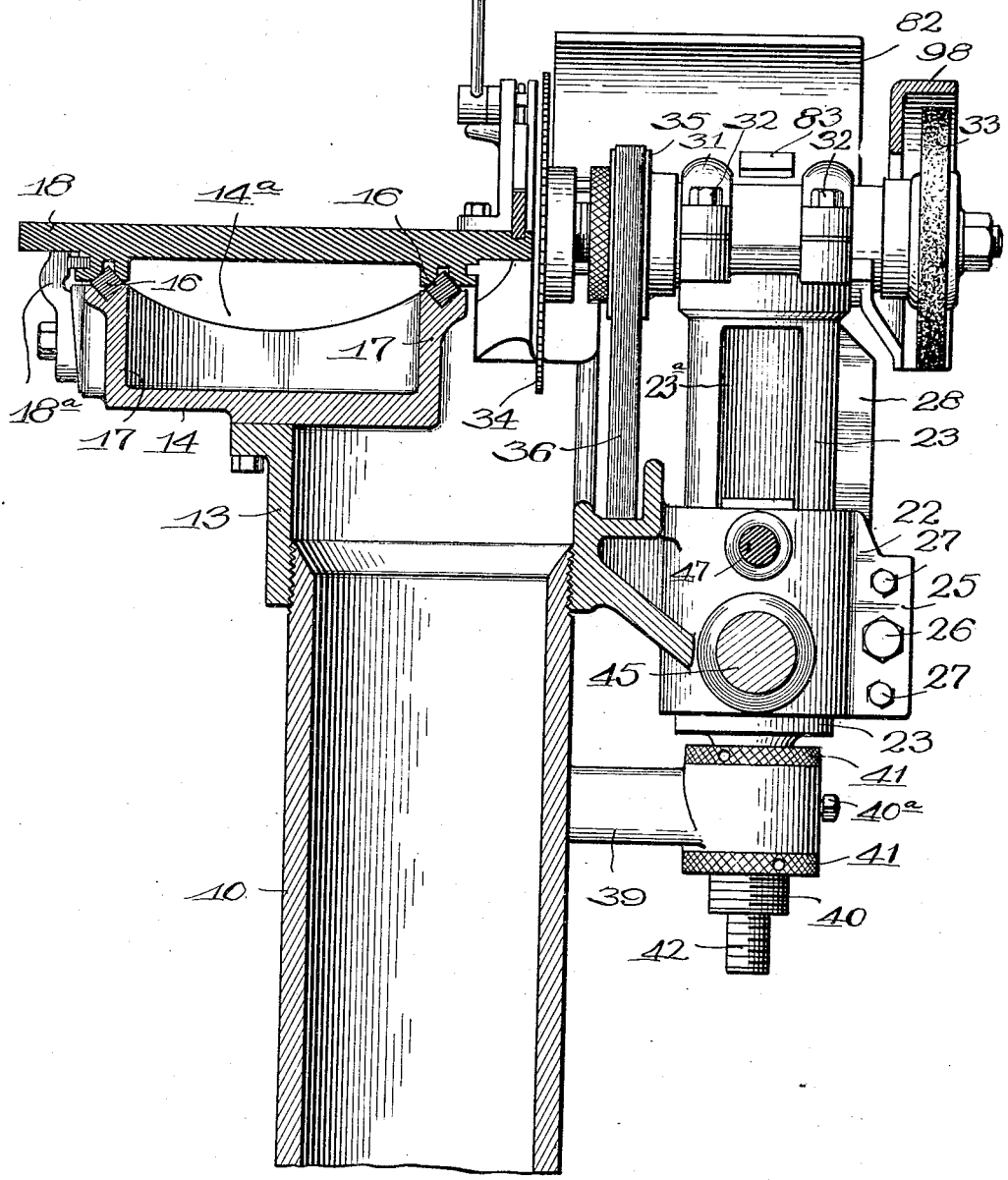

Patented Sept. 1, 1931

1,821,569

UNITED STATES PATENT OFFICE

CHRISTIAN B. NELSON, OF CHICAGO, ILLINOIS

SAWING-TRIMMING MACHINE

Application filed March 19, 1929. Serial No. 348,263.

This invention relates to improvements in sawing-trimming machines, usually designated as "saw-trimmers".

One object of the invention is to provide an improved machine of compact construction having a power driven saw which can be raised and lowered to position the same for the different characters of work to be performed.

Another object of the invention is to provide trimming mechanism which will trim or smooth the ends of the sawed article, removing any rough surfaces or burrs left by the saw.

A further object of the invention relates to means for adjusting the trimming device to vary the depth of cut thereof, said adjusting means being arranged to adjust the cutters simultaneously to exactly the same extent.

Another object of the invention relates to means for grinding the cutters and insuring that the same will be of the same length and thus when in use will cut a smooth surface.

A further object relates to the provision of means for under cutting and additional means for mitering.

Other objects of the invention relate to various features of construction and arrangement of parts which will be apparent from the consideration of the following specification and accompanying drawings wherein:

Fig. 1 is an end elevation of the machine.

Fig. 2 is a broken side elevation thereof.

Fig. 3 is a top plan view.

Fig. 4 is a broken vertical sectional view taken on line 4—4 of Fig. 3.

Fig. 5 is an end elevation parts being shown in vertical section.

Fig. 6 is a broken side elevation of a portion of the machine in the region of the saw.

Fig. 7 is a broken plan view taken on line 7—7 of Fig. 4.

Fig. 8 is a perspective view of the grinding mechanism.

Fig. 9 is a broken plan view of details of the mitering clamps.

Fig. 10 is a detached perspective view of two portions thereof.

In the drawings, 10 indicates a hollow supporting pedestal or column having a base 11 provided with a compartment 12 into which the shavings and other waste material removed by the saw and the trimming mechanism are collected, such material passing down from the saw and cutters, through the hollow pedestal, into the compartment.

As the present specifically shown and described embodiment of the improvement is designed particularly for use in printing shops for sawing and trimming line-o-type or monotype machine slugs and for other related work, the saving of the waste material is desirable. The compartment is closed by a removable door 12ª having any suitable latching means thereon, operable by the knob or handle 12ᵇ. To the upper end of the pedestal 10 is secured a head 13 which supports a table base 14 and other operating parts of the machine. The head 13 has flaring flanges 13ª which collect and direct the saw and trimmer cuttings into the pedestal 10 (see Fig. 6).

The table is preferably formed with a recess 14ª adapted to hold various implements and tools for use in making adjustments on the machine. The side walls of the table are provided with parallel rectangular bars 16 secured to the upper edges of the sides 17 which bars constitute slides for the movable table portion 18 which is slidably secured to the table base 14 by clamps 18ª. The top of the portion 18 is in the same horizontal plane with the upper opposite side portion 19 of the table. The slidable portion 18 carries a gauge, indicated generally by the numeral 20, and locking device 21, both of which will be referred to more specifically hereinafter. The head 13 has a laterally extending support 22 which has a vertical bore within which slides the short shaft or slide 23 on the upper end of which is mounted the saw and grinder shaft 24. The support 22 is in the form of a split cylinder and has each free edge provided with a flange 22′ provided with a tightening screw 26 and a pair of stop screws 27, whereby the support can be suitably contracted or tightened with reference to the slide 23 to prevent vibration of the saw and grinder during the operation of the machine. The slide 23 has secured thereto a vertical guide bar 28 which is disposed between the flanges 22' of the support 22 and prevents rotation of the slide 23.

As shown in Fig. 4, the shaft 25 is preferably provided with ball bearings 29 and is housed in a bearing sleeve 30 which is secured on the upper end of slide 23 by arms 31 which are adapted to be tightened by means of screws 32 (see Fig. 5). At one end, the shaft 25 carries a grinding wheel 33, and at its opposite end a circular saw 34. A pulley 35 is secured to the shaft over which passes a V-shaped belt 36 which is driven by the drive pulley 37 of a motor 38 which is mounted on the arm 39, as clearly shown in Fig. 2. The arm 39 is adjustably secured to the lower threaded end 40 of the slide 23 by means of a pair of knurled nuts 41. Rotation of the arm 39 about the threaded portion 40 is prevented by a set screw 40a which projects into the longitudinal slot 40b provided in said member 40. By adjusting the nuts 41 upwardly or downwardly, the arm 39 can be lowered and the belt 36 tightened. It will thus be seen that when the slide 23 is raised or lowered the motor, the saw, and grinder are carried therewith as a unit, and that raising or lowering the saw does not change the tension of the belt 36. For raising or lowering the saw I provide a threaded shaft 42 which is concentric with the slide 23 and meshes with inner threads in the lower portion of the slide, as shown in Fig. 4. The shaft is provided with a bevel gear 43 at its upper end and is supported on the end 44a of the arm 45 which extends forwardly through a longitudinal opening 23a formed in the slide 23. (See Fig. 5). A collar 44b is secured to the shaft 42, as shown in Fig. 4, which together with the interposed thrust washers 45a, resist vertical movement of the shaft as the same is rotated.

By rotating the shaft 42 with reference to the threaded portion 23a of member 23, the latter will be raised or lowered depending upon the direction of rotation of the shaft. The bevelled gear 43 meshes with a pinion 46 carried on the shaft 47, which extends through a boss 48 integral with the support 23. A collar 49 is secured to the shaft 47 and prevents inward movement of the gear 46. The outer end of the shaft 47 is supported in a bearing bracket 50 which is carried on the arm 44 previously described. A crank 53 is secured to the end of the shaft 47 whereby the same can be rotated for effecting the raising and lowering of the slide 23, and thus also the saw arbor.

The saw 34 is preferably secured by screws 55 to the circular plate 56 which is threaded on the reduced extension 57 of the shaft 24. A second threaded portion 58 of the shaft carries a knurled adjusting nut 59 which may be locked in position by means of set screws 52 on the portion 58. The nut 59 when turned in a direction to move to the left, as viewed in Fig. 4, will move cutters 60 in the same direction through openings provided in the plate 56 and registering openings 61 in the saw 34. The cutters 60 are locked in adjusted position by individual set screws 62. When the cutters are in the proper position for trimming they extend slightly beyond the outer plane of the saw. The cutters smooth the end of the article cut by the saws, removing the burr therefrom, and giving a very smooth surface.

This is desirable where the saw is used in sawing line-o-type or monotype printing slugs, as it is essential that the ends be square and smooth. In using the machine, the gauge stop 20a is adjusted properly, and the slugs, such as are shown at 63 in Fig. 3, are placed against the graduated gauge bar 64, and are then clamped in position by a suitable clamping device such as is illustrated at 21. As the clamping device and gauge form the subject matter of other applications, they will not be described in detail herein.

However, when the lever 65 is thrown forward, the bar 66 will be forced tightly against the slugs 63 and held firmly in position against the graduated gauge member 64. By sliding the table top 18, the slugs are moved against the saw 34 and are sawed off at substantially the proper length. Continuing the movement beyond the range of the saw teeth, the ends of the slugs 63 will be brought into position to be trimmed to the exact dimension by the trimming knives 60, preferably three in number. By throwing the lever 65 back, the slugs are released.

As will be apparent, the knives 60 must be of exactly the same length in order to cut a perfectly smooth surface on the ends of the slugs. To enable an operator to regrind the knives properly, I have provided an auxiliary holding tool, indicated generally by the numeral 68. This tool has a handle portion 69 and a base 70 having a true lower surface which is adapted to rest upon the edge of the stationary table portion 19a adjacent the grinding wheel 33. A depending flange 71 is adapted to fit over the edge of the table and slides along the ledge 72 thereof. It will thus be seen that by moving the holder 68 against the forward edge of the table and against the upper surface thereof, it can be slid back and forth to bring a cutter 60 into grinding position with reference to the wheel 33. The end of the holder has a socket forming member 73 therein, in which a cutter 60 to be ground is inserted. The opposite end of the socket member carries a threaded adjusting screw 74 having a lock nut 75 thereon. A locking screw 76 is also provided for holding the cutter 60 firmly in position. When a set of cutters requires regrinding, the adjusting screw 74 can be turned in to the proper position and locked by the lock nut 75. A cutter is then inserted in the socket member against the inner end of the screw 74, and tightened into position by means of the tightening screw 76. The holder 68 is then moved back and forth bringing the cutter into grinding relation with the wheel 33. When one cutter of a set has been ground, it is removed after loosening the screw 76, and another cutter inserted, the screw 74 being left, however, in its previously adjusted position. It will be apparent that by this device all the cutters of a set can be ground to exactly the same pitch and length, and that when placed in the position shown in Fig. 4, and properly adjusted by means of the nut 59, the cutting edges thereof will project exactly the same distance beyond the face of the saw 34.

Secured to the forward stationary portion 19ª of the table top is a ramming member 78 which is adapted to be tightened in position by means of a screw 79 to hold the same against accidental movement when not in use. This member has a rib, not shown, which extends into a transverse slot 80 formed in the table portion 19ª, whereby the face of the stop member is held in parallel relation with reference to the plane of the saw when the said member is manually reciprocated to ram the slugs firmly against the stop 20ª prior to clamping the slugs in position for the cutting off operation.

In employing the machine for under cutting or sawing rectangular openings in plates, for example, the handle 52 is operated to lower the saw the desired extent, in which position the hinged portion 82 of the stationary side of the table 19 will be lowered to the plane of the table and will overlie the saw arbor thus providing an unobstructed surface for the plate for performing the operation. As will be seen, the cutter blades are disposed inwardly of the circumference of the saw sufficiently so they will not function during the under cutting operation. When the saw is again raised for cut off sawing or trimming the hinged portion 82 is raised by the upwardly moving sleeve 30 engaging a lug 83 formed on the lower surface of said hinged portion.

The machine can also be used for sawing slugs or other articles at an angle, as in forming miter points. For this purpose the auxiliary clamp form 86 is placed over the gauge bar 64 as indicated in Fig. 9, a stud 86ª fitting in an opening 87 to hold the form in position. The form has two wings 88 disposed at 45° angles. Secured to an adjacent corner of the movable table is a block 89 through which passes a screw 90 to the end of which is secured a clamp 91 having a rib (not shown) which slides in the groove 92 of the table top. The clamp 91 has a vertical face 93 disposed at a 45° angle and between the same and the adjacent face 88 of the form 86 the articles to be mitered are clamped by the screw 90.

The table is moved forwardly, carrying the articles against the saw for cutting and trimming. The articles, if to be mitered on the opposite ends also are then placed against the other face 88 of the form 86 in proper position. A triangular block 94, having a recess 95 therein and a transverse pin 96 in the recess, is then placed in engagement with the end of the clamp bar 66, the pin 95 fitting in the recess or notch 97 formed in the bar near its end. The clamp is then moved forwardly locking the block 94 firmly against the article, such as is illustrated at 98 in Fig. 9. The movable table is then operated to perform the sawing and trimming, as before.

A guard 98 is provided for the grinding wheel 33 and a guard 99 for the saw 34, the latter being pivoted at 100 to a lug 101 formed on the lower side of the stationary table portion 19.

An outlet box 102 is secured at any suitable place to the machine, as to the support 22, the current to the motor 38 being carried by the armored cables 103 and controlled by a switch 104 placed near the forward end of the machine where it is conveniently accessible to the operator.

Although I have shown and described a specific embodiment of the invention for the purpose of illustration, I do not wish to be restricted specifically thereto except as so limited by the appended claims.

1. In combination a supporting member comprising a cylinder, a slide movable within said cylinder, a motor driven tool carried by said slide, a support secured to and movable with said slide, a motor carried by said support, and means for operating said slide with reference to said cylinder for raising and lowering said tool.

2. In combination a saw table, a support therefor, a guide member carried by said support, a slide member movable through said guide member, a saw carried by said slide member, and means for adjusting said slide member vertically to raise and lower said saw with respect to said table.

3. In combination a saw table, a support therefor, a guide member carried by said support, a slide member movable through said guide member, a saw carried by said slide member, and means for adjusting said slide member vertically to raise and lower said saw with respect to said table, said guide member being adjustable for tightening the same with respect to said slide member.

4. In combination, a support, a guide member secured thereto, said member being in the form of a split cylinder having outwardly disposed flanges, a slide member movable vertically within said cylinder and having a longitudinal rib disposed between said flanges to prevent relative rotation of said guide and slide, and means for adjusting said flanges relatively one to the other for controlling the clearance between the cylinder wall and said slide.

5. In combination, a support, a guide member secured thereto, a slide member movable within said support, a rotary tool carried by said slide, means for raising and lowering said slide for varying the elevation of said tool, an arm supported by said slide, a motor carried by said arm and having a belt for driving said tool, and means for adjusting said arm on said slide for varying the tension of said belt.

6. In combination, a support, a guide member secured thereto, a slide member movable within said support, a rotary tool carried by said slide, means for raising and lowering said slide for varying the elevation of said tool, an arm supported by said slide, a motor carried by said arm and having a belt for driving said tool, and means for adjusting said arm on said slide for varying the tension of said belt, said last named means comprising a pair of coacting members threadedly carried by said guide, one above and the other below said arm.

7. In combination, a saw table having a slidable table section, a stationary bar secured to said section, a pair of clamping members one disposed on each side of said bar, said members having clamping faces disposed at angles to said bar, and a stop member removably secured to said bar and provided with a pair of faces each complemental to the clamping face of one of said clamping members whereby articles to be sawed can be held at an angle with respect to said bar.

8. In combination, a saw table having a slidable table section, a stationary transverse bar secured to said section, a clamp for holding articles to be sawed rigidly against said bar for cut off sawing, and a pair of auxiliary holding members one adapted to be detachably secured to said clamp and the other to said bar, said holding members having complemental vertical faces inclined with respect to said bar for holding articles to be sawed at a bevel.

In testimony whereof, I have hereunto affixed my signature.

CHRISTIAN B. NELSON.